United States Patent [19]

Babson et al.

[11] Patent Number: 4,937,806
[45] Date of Patent: Jun. 26, 1990

[54] SHOCK-ISOLATED PORTABLE MASS DATA STORAGE DEVICE

[75] Inventors: Brian A. Babson, Huntington Beach; Dieter G. Paul, Fullerton, both of Calif.

[73] Assignee: MDB Systems, Inc., Orange, Calif.

[21] Appl. No.: 159,536

[22] Filed: Feb. 12, 1988

[51] Int. Cl.[5] .............. G11B 33/00; G11B 23/02; H05K 7/10

[52] U.S. Cl. .............. 369/75.1; 360/137; 361/391; 364/708; 369/263; 439/247

[58] Field of Search ............ 369/75.2, 75.1, 263, 369/246, 247; 361/391; 364/708; 360/137; 439/247, 248, 106

[56] References Cited

U.S. PATENT DOCUMENTS

| | | |
|---|---|---|
| 4,260,208 | 4/1981 | Ho et al. |
| 4,479,198 | 10/1984 | Romano et al. ............ 364/708 |
| 4,542,421 | 9/1985 | Fujibayashi . |
| 4,679,884 | 7/1987 | Klemp ............ 439/106 |
| 4,695,996 | 9/1987 | Sugilara et al. ............ 369/263 |
| 4,705,257 | 11/1987 | Leo et al. . |
| 4,717,982 | 1/1988 | Toreson et al. ............ 364/708 |
| 4,719,526 | 1/1988 | Okita et al. ............ 360/97 |
| 4,725,244 | 2/1988 | Chewning et al. ............ 364/708 |
| 4,794,588 | 12/1988 | Yoshitoshi et al. ............ 369/263 |

FOREIGN PATENT DOCUMENTS

| | | |
|---|---|---|
| 0335490 | 10/1989 | European Pat. Off. . |
| 2594997 | 1/1986 | France . |
| 2119152 | 11/1983 | United Kingdom . |
| 2153130 | 8/1985 | United Kingdom . |

OTHER PUBLICATIONS

Patent Abstracts of Japan, vol. 12, No. 492 (P-804)(3339) Dec. 22, 1988.
IBM Technical Disclosure Bulletin, vol. 27, No. 7b, Dec. 1984, New York, U.S., pp. 4206–4209; M. A. Cook et al.; "Customer Set-Up and Replaceable DASD Assemblies".
Computer Technology Review, vol. 3, No. 1, Jan. 1983, Los Angeles, U.S., pp. 199–208; Mabon et al.; "Built-in Toughness Suits Hard Disks to Face the Real World".

Primary Examiner—Steven L. Stephan
Attorney, Agent, or Firm—Nixon & Vanderhye

[57] ABSTRACT

A portable mass storage device (e.g., a hard disk drive) is shock-isolated at all times; (a) within the chassis of a computer and (b) during its removal and transport to a location remote from the computer chassis. The mass storage device is housed within a canister which is removably mountable within the chassis. A bracket is attached to each lateral side of the mass storage device and a pair of suitable elastomeric shock-isolators extend between each respective one of the brackets and its adjacent canister sidewall so as to mount it in spaced relation to the canister. Power supply to the mass storage device (or any other electrical component) may be disabled/enabled automatically in response to relative separation/closing movement between a pair of connectors. In this manner, "arcing" and other problems which might occur with such a removable unit are automatically avoided in a fail-safe and cost effective manner.

29 Claims, 5 Drawing Sheets

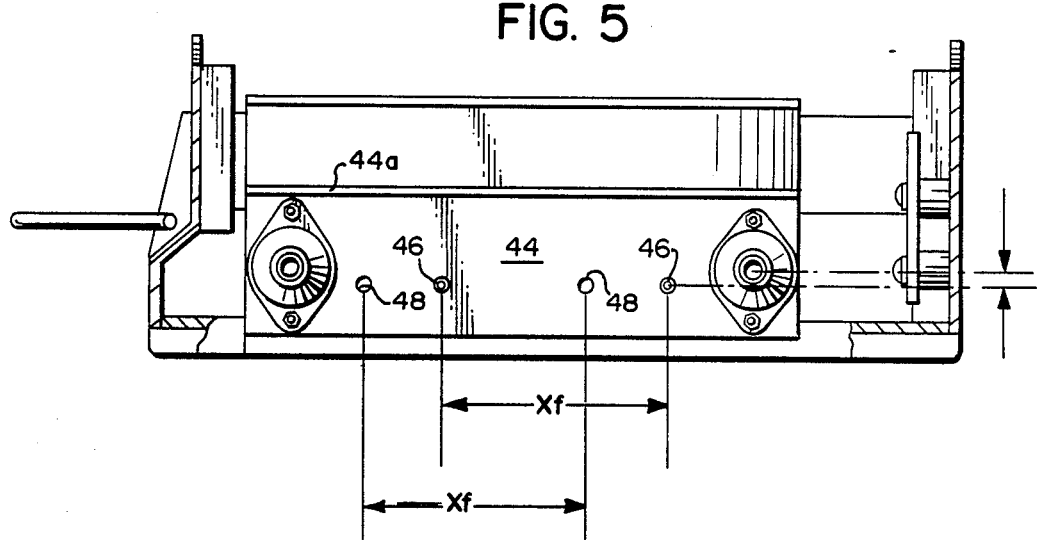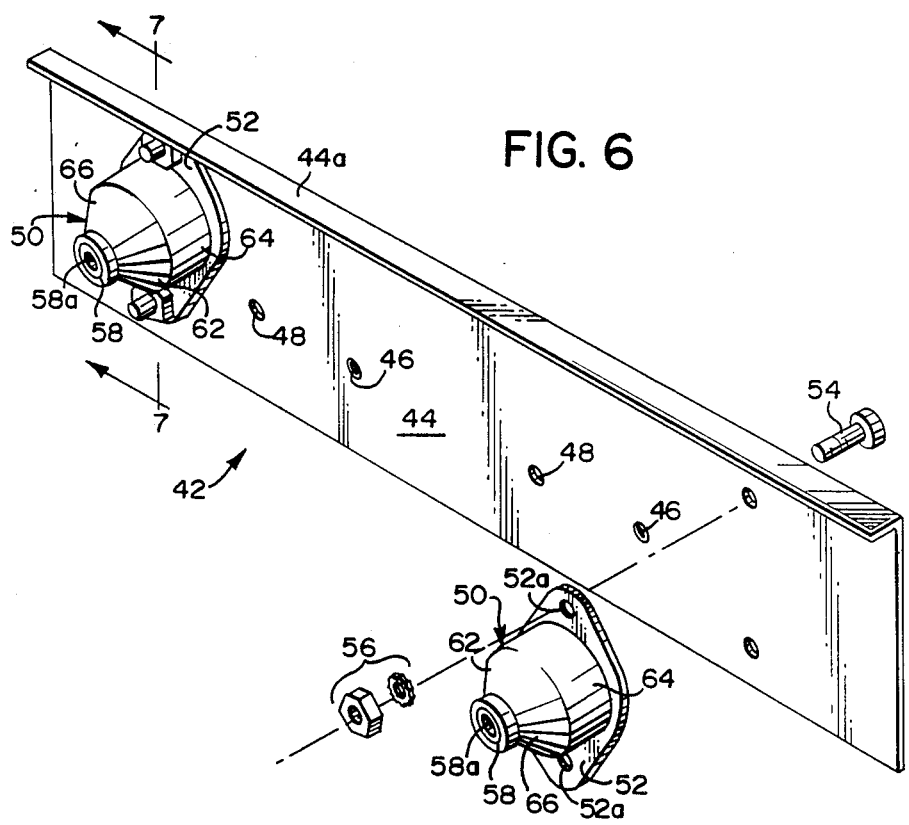

SHOCK-ISOLATED PORTABLE MASS DATA STORAGE DEVICE

FIELD OF THE INVENTION

This invention generally relates to the field of mass data storage devices (e.g. disk drives) of the type which are removably mounted within a computer chassis as part of an overall data storage system. It more specifically relates to a shock isolated mass data storage system which significantly minimizes the risk of data being lost due to head crashing, for example when the system is removed from the computer chassis. The shock-isolated mass storage device may also include a sub-system which automatically disables the power supply to the mass storage device in response to its removal from the computer chasis—yet prior to its actual physical disconnection therefrom while also effecting delayed application of power to the drive upon insertion into the chassis.

BACKGROUND AND SUMMARY OF THE INVENTION

Mass storage devices, such as, hard disk drives, optical disk drives and the like, are well known components of an overall computer data storage system. Mass storage units have, in the past, usually been bolted and hardwired inside a computer chassis and were only removed from the chassis (with significant effort) in the event of needed maintenance or the device's failure.

Recently, however, mass storage devices have been developed which are in the form of modular units capable of being operatively and easily removably mounted within a computer chassis. Due to their modular nature, these portable individual mass storage devices are particularly useful when dedicated to the storage of important data which the user does not wish to be continuously in operative association with the computer for security and/or data integrity reasons. These individual portable mass storage devices can thus be removed easily from the computer chassis and stored in a secured location remote from the computer site until the data is needed, at which time the mass storage device is retrieved, transported and operatively reinstalled within the computer chassis (as by sliding the mass storage device into a "slot" in the computer chassis). In such a manner, the risks associated with unauthorized persons intentionally tampering, copying, or stealing the stored data (with the possible disastrous loss of valuable data) and/or unintentional data loss is minimized.

However, the transport of these portable mass storage devices presents its own risks of data loss during handling outside the chassis since they are readily susceptible to damage due to shocks received when the device is dropped, struck or otherwise mishandled. That is, when mishandled, the read/write head of the mass storage device may physically contact the data storage medium (i.e., a so-called "head crash") thereby damaging it to an extent that one or more of the stored data files is lost (i.e., irretrievable). Mass storage devices have included in the past mechanical means which locks the read/write head during transport, in addition to special software-controlled mechanical interlocks (e.g., which parks the head at a "storage" position and/or at a section of the disk on which no data is stored) as protective measures in an attempt to prevent head crash and data loss due to shock waves experienced by mishandling the mass data storage device. However, these conventional protective mechanical and software systems are usually insufficient in the case of severe shock waves (as when the mass storage device is dropped onto a surface). And, in any event, such mishandling may damage other shock sensitive components of the mass storage device (e.g., precision motors, control circuitry, et cetera).

Mass storage devices, including the more recently developed portable versions, have in the past been shock-isolated when operatively associated with the computer's chassis (see, for example, U.S. Pat. No. 4,705,257, the entire disclosure of which is expressly incorporated hereinto by reference). While shock-isolation of the mass storage device is important when it is operatively associated within the computer's chassis, it is equally (if not more) important for the device to be shock-isolated while removed from the chassis and while being transported to a different location.

Recently, however, a canister/drive assembly which shock isolates the drive at all times (i.e., not only when the drive is operatively associated within the computer chassis, but also when it is removed from the chassis for transport, et cetera) has been sold for more than one year prior to the date of this application. Such a canister/drive assembly 1 is schematically shown in accompanying FIG. 1 and is generally representative of the Series 3000 and 4000 systems previously sold by MDB Systems, Inc. (the Assignee of this application).

As is seen, the assembly 1 includes a canister 2 defining an interior space 2a in which a drive 3 was mounted for shock and vibration isolation via three substantially hemispherical elastomer isolators 4. The canister 2 was slidably received within a computer chassis 5 so that it could easily be removed therefrom (as indicated by the dashed line representation). The isolators 4 were positioned in a trilateral arrangement relative to the drive 3—that is, two of the isolators 4 were positioned between respective sides of the drive 3 and an adjacent portion of the canister 2, while the remaining isolator 4 was positioned between the front of the drive 3 and an adjacent front portion of the canister 2. This third isolator provides both tension and compression shock isolation forces and thus can, in effect, be considered as equivalent to a pair of isolators, one located at each end of drive 3.

While the canister/drive assembly 1 shown in FIG. 1 shock and vibration isolates the drive 3 at all times during operation and transport, it is too costly for most removable mass data storage applications—and tends to use a lot of internal space in the removable module 2 since the isolators 4 located on at least three sides of drive 3 consume space greatly in excess of the needed "sway space." Hence, the canister/drive assembly 1 tended to be cost and space effective only for those applications in which the shock and vibration isolation functions were an absolute necessity (i.e., as in military field computer applications) and where sufficient excess space is available. What has still been needed therefore, is a shock isolation mounting system for removable drives which is less costly and more space efficient so that general consumer computers may, for example, have shock protected removable drive modules. It is towards fulfilling this need that the present invention is directed.

According to the present invention, a mass storage device (which shall be hereinafter simply be termed "drive" for ease of reference) is provided in a portable canister which is sized and configured to be mounted removably and operatively within the chassis of a computer. Shock-isolation of the drive is provided through a pair of brackets rigidly mounted to respective lateral sides of the drive. Each of the brackets includes a pair of elastomeric shock-isolators connected to, and extending between, itself and an adjacent sidewall of the canister. The front and rear ends of the drive are thus left freely floating within the canister so that only the requisite "sway space" need be left at these locations (thus maximizing space efficiency). The drive thus is mounted within, and in spaced relation to, the canister so that shock waves experienced by the canister/drive assembly will be absorbed by the elastomeric shock-isolators and thus significantly minimize the risk of head crash during its transport —while yet remaining very economical and space efficient.

The canister also preferably houses a printed circuit board which is electrically coupled to the drive via any suitable conventional means (e.g., multiwire ribbon connectors, and the like). The printed circuit board may itself be mounted to the canister by means of elastomeric feet allowing the board to "float" (i.e., be resiliently displaced) when the canister/drive assembly is slid into operative engagement with the computer chassis so as to permit the pin connectors of the board to passively align with female connectors in the chassis.

Since the drive is mounted in spaced, shock-isolated relation to the canister, merely removing the canister from the computer chassis will not defeat the drive's shock isolation. Rather, shock isolation of the drive is provided at all times during the drive's physical transport from one location to another—even when it is disassociated from the computer chassis.

The removable nature of the canister/drive assembly of the invention presents a risk that the power supply (normally remaining with the chassis when the canister/drive is removed) will not be manually turned off by the user before the canister/drive is removed—as it should always be. Conversely, the user may forget to turn the chassis power off prior to the canister/drive being reinserted into the chassis. Either condition could cause arcing between the connector pins of the canister and their associated female connectors of the chassis and/or possible head/disk surface damage.

In order to avoid such problems (which arise primarily because of the readily removable nature of the drive canister) the present invention further includes a protective system for sensing relative separable movement between the male and female connectors and, in response to this sensed movement, to disable the power supply before the male and female connectors actually physically separate. Conversely, when the canister/drive is reinserted into the chassis, the protective system functions to supply power to the mass storage device only after the pins of the male connector have electrically connected with their respective female connectors. As can be appreciated, since the male and female connectors are electrically "dead" during making and breaking of their electrical connections during installation/removal of the canister drive assembly, arcing of the connector pins is prevented and possible head crashes are avoided. Other advantages also flow from this arrangement.

Preferably, the sensing and disabling functions of the protective system briefly mentioned above are achieved by control circuitry associated with at least one pin of a multiple pin connector which is shorter in length as compared to the other connector pins. In this manner, the shorter pin(s) is(are) the first to "break" and the last to "make" contact with its (their) female connector(s) (i.e., as compared to the longer pins) during removal/insertion of the canister drive assembly. The control circuitry thus serves to ensure that the power supply is switched off/on only while the longer pins are in physical and electrical contact with their female connectors during removal/insertion of the canister/drive assembly relative to the chassis.

Further advantages and features of this invention will become more clear after consideration is given to the following detailed description of the presently preferred exemplary embodiments.

BRIEF DESCRIPTION OF THE DRAWINGS

Reference will hereinafter be made to the accompanying drawings wherein like reference numerals throughout the various FIGURES denote like structural elements, and wherein:

FIG. 5 is an interior side elevation view of the canister/drive assembly shown in FIG. 3, taken along line 5—5 therein;

FIG. 6 is a perspective view of one exemplary shock-isolation mounting employed in the canister/drive assembly of FIG. 3;

DETAILED DESCRIPTION OF THE PRESENTLY PREFERRED EXEMPLARY EMBODIMENT

Figure 1:
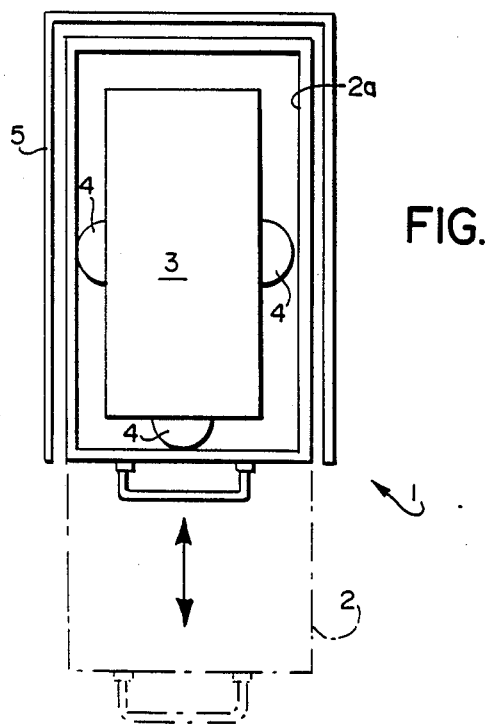
FIG. 1 is a schematic plan view of a prior art removable canister and shock-isolated drive assembly mounted therein.
Figure 2:
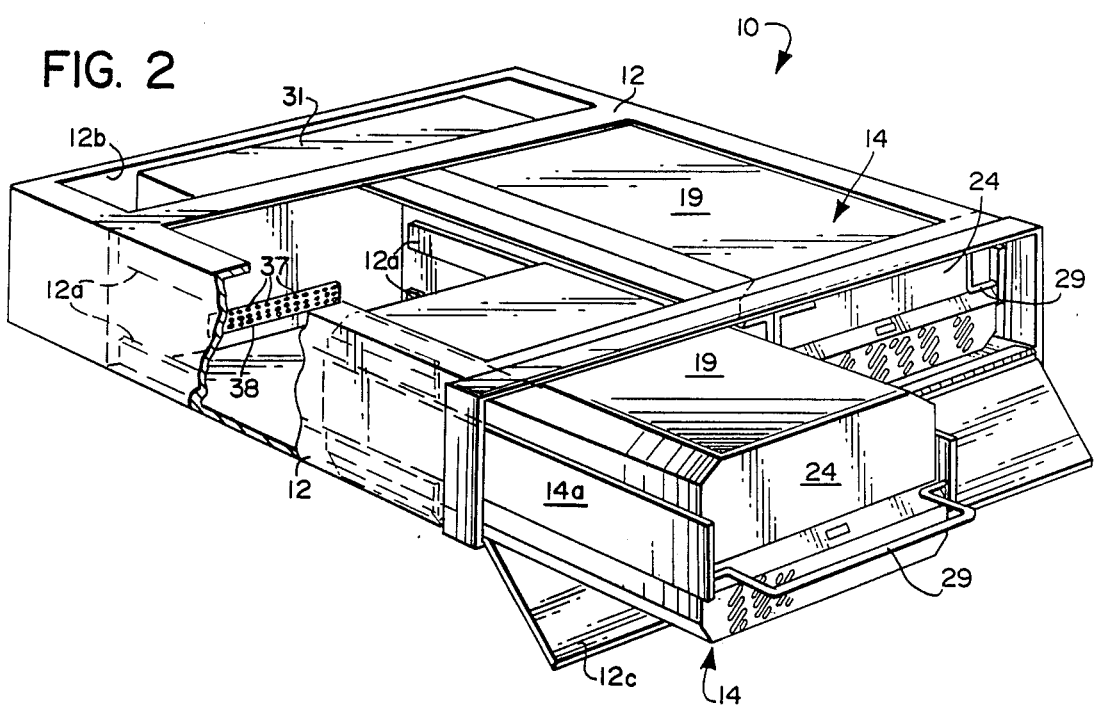
FIG. 2 is a schematic perspective view of a computer chassis having several removable and portable canister/drive assemblies of this invention in operative association therewith.

A computer data storage system 10 is shown in accompanying FIG. 2 as including chassis 12 having individual locations for slidably and removably receiving multiple individual canisters 14. The interior of chassis 12 is preferably provided with a pair of spaced-apart guides 12a which slidably receive a respective one of the rails 14a rigidly mounted to the side of canister 14 (only one such rail 14a being visible in FIG. 2). Thus, the canisters 14 may be disassociated from chassis 12 (as by manually pulling them out of their operative association with chassis 12) so as to permit each canister 14 to physically be transported to a different location, as may be desired. However, when installed in the chassis 12, a front panel 12c may be pivoted into covering relationship to the canisters 14 so that power switches, status LED's and the like (not shown in FIG. 1, but see FIG. 9) may be visible to the user.

The chassis 12 is provided with a rear compartment 12b for housing the usual power supply, control circuitry, signal processing circuitry, et cetra, which are collectively identified in FIG. 2 by reference numeral 31 and will hereinafter be simply referred to as "power/control circuitry 31".

Figure 3:
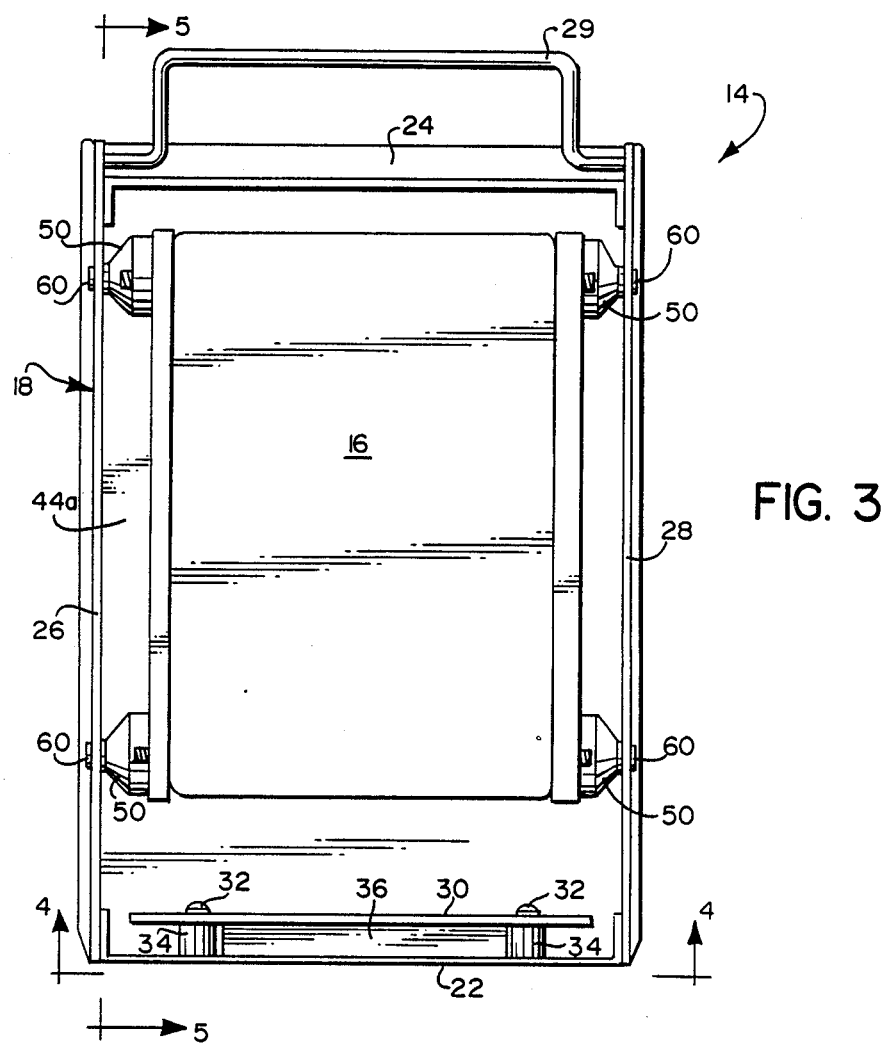
FIG. 3 is a top plan view of an exemplary removable and portable canister/drive assembly showing an embodiment of the shock isolation system according to this invention.
Figure 4:
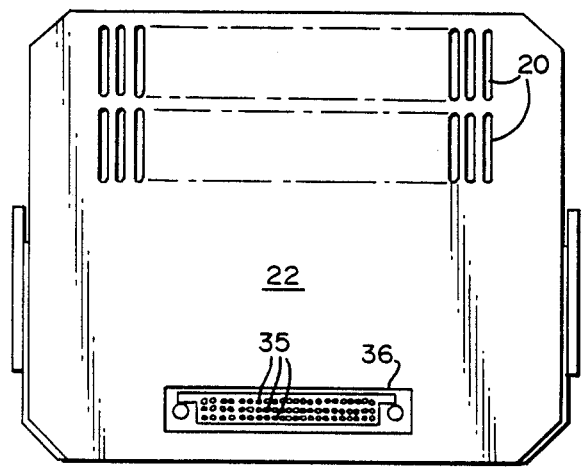
FIG. 4 is a rear view of the canister/drive assembly shown in FIG. 3, taken along line 4—4 therein.

An exemplary canister 14 is shown more clearly in FIGS. 3–5 as including a mass storage device, which in the embodiment shown is a disk drive 16, mounted within canister housing 18. The canister housing 18 is preferably closed at its top by means of a cover 19 (see FIG. 2), but is shown in FIGS. 3 and 5 with the cover 19 removed for clarity of presentation. Vents 20 are provided in the rear wall 22 of canister housing 18 so as to permit the drive 16 to be air-cooled by means of a conventional fan (not shown). The drive 16 is thus bounded by the canister's opposed rear and front walls 22, 24, respectively, and its opposing pair of side walls 26, 28. A handle 29 is pivotally affixed to the front edge regions of side walls 26 and 28 adjacent the front wall 28 so as to more easily permit manual removal/insertion of assembly 14 from/into chassis 12 and its transport to/-from a remote location.

A printed circuit board 30 is mounted to the interior surface of the rear wall 22 by means of bolts 32 which serve to hold the board 30 against resilient, elastomeric mounting feet 34 in spaced relation to the interior surface of the rear wall 22. The mounting feet 34 permit the board 30 to be resiliently displaced within the board's plane so as to cause the pins 35 of male connector 36 associated with the board 30 to be aligned and mated with respective sleeves 37 of female connector 38 (associated with the computer chassis 12 when canister 14 is slid into operative engagement within the chassis 12, see FIG. 2) thereby establishing electrical communication between the drive 16 and the power/control circuitry 31 (see FIG. 2). That is, since precise alignment of the pins 35 of the board 30 and the sleeve connectors 37 associated with the chassis 12 cannot be assured, resilient displacement of board 30 provided by means of feet 34 permits some displacement of the board 30 when installed in chassis 12 and thus aligns the pins 35 and the sleeve connectors 37. Of course, mated engagement of the pins 35 and the sleeve connectors 37 operatively interconnects the drive 16 with the power/control circuitry 31 by means of flexible multiwire ribbon connectors (not shown) connected between the board 30 and the drive 16.

Shock isolation of the drive 16 is provided, according to this invention, by means of a pair of shock-isolation assemblies 42 disposed along each respective lateral side of the drive 16. The assemblies 42 are shown more specifically in accompanying FIGS. 5 and 6. FIG. 6, although showing only one assembly 42, is likewise representative of the other assembly 42. As is seen, assembly 42 includes a mounting bracket 44 which preferably includes an integral perpendicular flange 44a for structural reinforcement purposes.

Paired apertures 46, 48 are provided in bracket 44 in a location which corresponds to the industry-standard thread sites associated with the drive 16. That is, the aperture pairs 46, 48 are each separated by an industry standard dimension $X_f$ and are, in turn, asymmetrically disposed relative to the drive's midplane. The paired apertures 46, 48 thus accept mounting screws so as to rigidly mount the bracket flush against the lateral sides of drive 16. As can be appreciated, when the bracket 44 is installed on the lefthand side of drive 16 (as viewed in FIG. 3) then the aperture pair 46 is employed since they will then be aligned with the industry-standard thread sites associated with drive 16. On the other hand, when the bracket 44 is installed on the righthand side of drive 16 (as viewed in FIG. 3), the other aperture pair 48 will then be employed since they will then be in alignment with the industry-standard thread sites on that side.

A pair of shock-isolators 50 are mounted to the bracket 44 at locations along the linear extent, and closely adjacent respective terminal ends, of the bracket 44 so that the isolators 50 are, insofar as possible, approximately symmetrically disposed about the center of gravity of the drive 16 (the exact location of the center of gravity may vary from one type drive to the next). Each isolator 50 is preferably provided with a mounting flange 52 defining an opposing pair of apertures 52a through which mounting bolts 54 pass so that nut/-washer means 56 can be threaded upon their respective bolt's shaft to securely mount each isolator 50 against its respective bracket 44. The shock isolators 50 are also provided with a mounting nipple 58 (preferably formed of metal) which defines a threaded bore 58a in which mounting bolts 60 (see FIG. 3) may be threadably coupled so as to secure the nipple 58 (and hence the isolator 50 with which it is associated) to a respective sidewall of canister housing 18.

Figure 7:
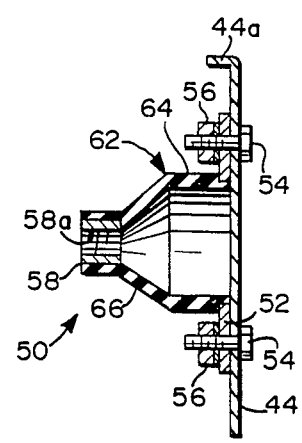
FIG. 7 is a cross-sectional elevational view of a representative shock-isolator shown in FIG. 6, taken along line 7—7 therein.

An elastomeric body 62 (preferably formed entirely of Neoprenee ®, but other suitable shock-absorbing elastomers may be employed) extends between flange 52 and nipple 58. As is seen in FIG. 7, the body 62 preferably is formed of a generally cylindrical rearward (i.e., towards the drive 16) wall portion 64 and an integral forward (i.e., towards the sidewall of the canister 18) generally truncated conical wall portion 66. Thus, the flange 52 is coupled to cylindrical wall portion 64, while the nipple 58 is coupled to the truncated end of conical wall portion 66.

The shock-isolator 50 generally described above and shown in the accompanying drawings is commercially available from Barry Control of Burbank, California, Model No. ME 500-4. However, other geometric configurations and elastomeric materials may be employed, the particular selection being dependant upon a number of design and performance criteria, such as the overall dimensions of the isolator, its shock-absorbing characteristics and the like. Any such isolator should exhibit a minimum performance characteristic such that a "sway space" of about 0.40 inch is provided for the drive 16. By the term "sway space" is meant the maximum dimensional displacement of drive 16 within canister housing 18 at which the isolators 50 absorb substantially all of the shock waves causing such displacement and hence effectively shock-isolate the drive 16. While, of course, it is impossible to shock isolate the drive 16 against the force of shock waves of catastrophic magnitude, by employing isolators 50 substantially symmetrically disposed about the drive's center of gravity but located only on two opposing sides of the drive, and allowing a free sway space of about 0.40 inch around all (e.g., six) surfaces of drive 16, then most (if not all) shock waves normally encountered during transport of the canister/drive assembly of this invention can be effectively absorbed. Thus, effective shock isolation of the drive 16 is achieved in a space and cost efficient manner.

It should be noted that this arrangement avoids the need to employ any space-consuming isolator at either end of the drive 16, which represents one significant difference between the present invention and the prior art shock and vibration isolation assembly 1 shown in accompanying FIG. 1. Thus, according to this invention, front to rear shock isolation forces are controlled by the radial displacement of the pairs of side-mounted isolators 50. In addition, the particular geometry, elastomeric material (and its corresponding physical attributes) of isolator 50 advantageously provide for shock isolation of the drive 16 in about one-half the sway space as compared to the sway space achieved using the elastomer material and hemispherical geometry of the isolators 4 shown in the prior art assembly 1 of FIG. 1.

Figure 8C:
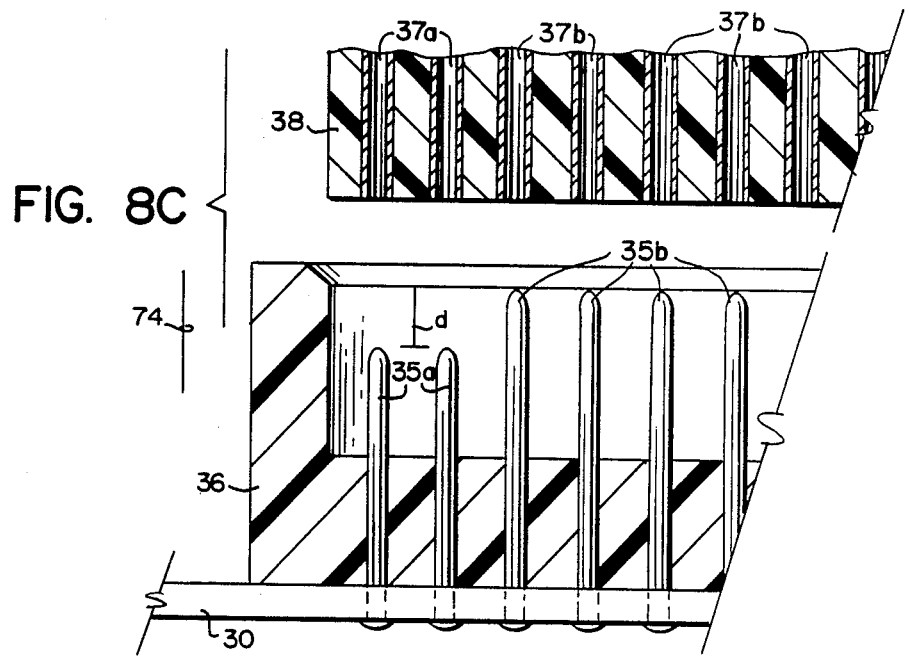
FIGS. 8a–8c are sequential sectional plan views of the multiple pin connector employed in the protective system of this invention shown at various states during removal of the canister/drive assembly.
Figure 8B:
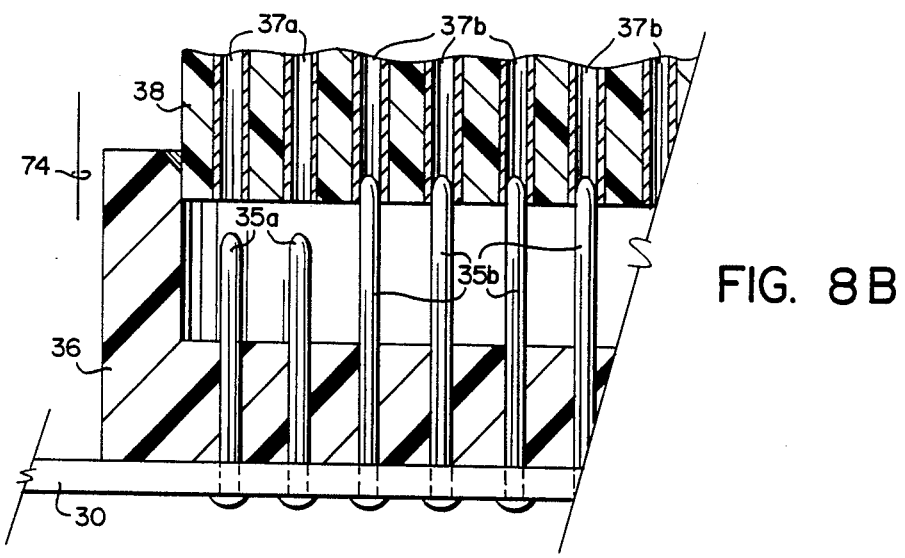
Figure 8A:
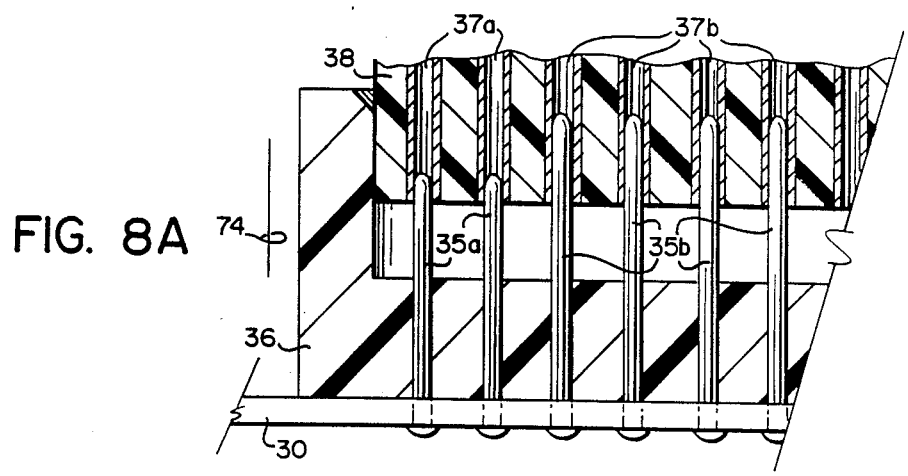

The male and female connectors 36, 38, respectively, of this invention are shown more clearly in FIGS. 8a–8c. As is seen, the male connector 36 is provided with multiple length pins, the shorter pins being designated by reference numeral 35a, and the longer pins being designated by reference numeral 35b. FIG. 8a is shown in a state where the male connector 36 has begun to separate from the female connector 38 (as occurs when a user manually removes the canister/drive 14/16 from chassis 12 in the direction of arrow 74) but the shorter and longer pins 35a and 35b are still in physical contact with their respective conductive sleeves 37a and 37b of female connector 38, respectively. As the male connector 36 is further separated from the female connector 38, the shorter pins 35a will first become physically separated from their respective conductive sleeves 37a while the longer pins 35b remain in contact with their conductive sleeves 37b. This state is shown in accompanying FIG. 8b. Finally, as shown in FIG. 8c, further continued movement of male connector 36 from female connector 38 in the direction of arrow 74 will cause all pins 35a and 35b to become separated from their respective conductive sleeves 37a and 37b.

As can be appreciated, the shorter pins 35a are the first to break and the last to make contact with the female connector 38 as compared to the longer pins 35b when the canister 14 is removed from and inserted into the chassis 12, respectively. This permits the protective circuitry (which will be described below with reference to FIG. 9) of this invention to disable/enable power to the longer pins 35b only when they are in physical and electrical contact with their respective conductive sleeves 37b of the female connector 38 thereby preventing arcing therebetween and other potential problems. For example, no extra electromechanical switches are required to provide fail-safe automatic head parking or to prevent contact arcing or to insure connection of all power and signal connectors before power is actually supplied to the drive. The result is a particularly cost-effective fail-safe system that is relatively simple to realize.

Thus, the dimension "d" by which the length of the pins 35a are shorter than the pins 35b (and which, in the preferred embodiment, is about 2 mm) effectively functions as a sensor which will initiate the protective control circuitry of this invention.

For normal removal rates of the canister/drive 14/16, dimension "d" (coupled with the protective control circuitry to be described below) will cause the power supplied to the longer pins 35b to drop to substantially zero volts before they break electrical contact. This abrupt voltage drop also will typically cause the inherent protective system of many drives 16 to, for example, initiate head protection circuitry so as to quickly park the heads in proper zones relative to the data storage medium.

Figure 9:
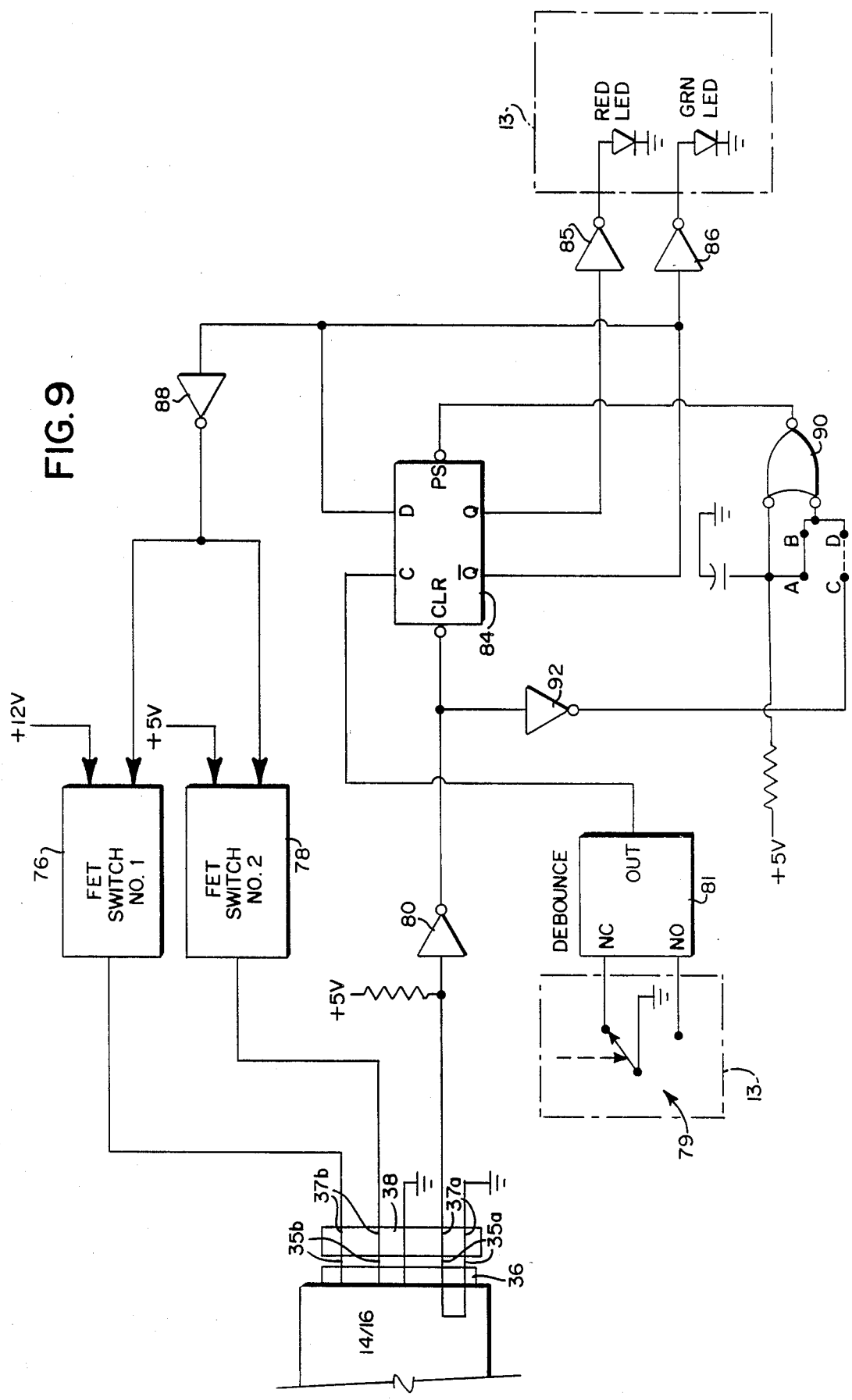
FIG. 9 is a diagram of an exemplary control circuit which may be employed with the protective system of this invention.

FIG. 9 is a schematic diagram of an exemplary protective control circuitry and is shown in a state whereby the canister/drive 14/16 assembly is operatively associated with the chassis 12 (not shown in FIG. 9) by mated interconnection of the male and female connectors 36 and 38. For the particular canister/drive 14/16 shown, power in the form of +12 and +5 volts is supplied though field effect transistor (FET) switches 76, 78 to respective sleeve/pins 37b/35b of the female and male connectors 38 and 36, respectively.

With the canister/drive operatively associated in the chassis 12, a user need only depress momentary switch 79 (e.g., located on front panel 12c) so as to provide a clock input (via debounce circuit 81) to flip-flop 84. At this time the synchronous input "D" is being supplied with logic "0" from the $\overline{Q}$ output of flip-flop 84 thereby causing the Q and $\overline{Q}$ outputs to reverse—that is, Q becomes logic "0" (thereby illuminating the red LED via inverter 85) and $\overline{Q}$ becomes logic "1" (thereby extinguishing the green LED via inverter 86). The logic "1" from the $\overline{Q}$ output is supplied as an input to inverter 88 which thus outputs logic "0" turning the FET switches on and enabling power to be supplied to the canister/drive 14/16 via pins/sleeves 35b/37b, respectively.

During removal of the canister/drive 14/16, the shorter pins 35a will be disconnected from the female connector 38 prior to disconnection of longer pins 35b (i.e., the state shown in FIG. 8b). At this time, the input to inverter 80 will jump to logic "1" (i.e., since the +5 volt supply is no longer being shunted to ground via the jumpered interconnection of shorter pins 35a) which, in turn, provides logic "0" at the inverted CLR input to flip-flop 84. This event will, in turn cause the $\overline{Q}$ output to change from logic "1" to logic "0" thereby causing the green LED to receive a logic "1" (due to inverter 86) and be illuminated. The logic "0" from the $\overline{Q}$ output is also supplied as an input to inverter 88 thereby supplying a logic "1" to disable FET switches 76, 78 and remove power from the drive. At this time, the Q output of flip-flop 84 becomes, of course, logic "1" thereby extinguishing the red LED via inverter 85.

Optionally, the male and female connectors 36 and 38, respectively, may be shunted such that power is automatically supplied to canister/drive 14/16 in response to its being installed in the computer chassis 12. This is accomplished via shunt plugs A-D which are shown in a state whereby power to canister/drive 14/16 is initiated via switch 79—that is with plugs A and B jumpered together. In this state, it will be seen that the preset input PS to flip-flop 84 has no effect on the logic functions described above. If, on the other hand, a user desires to have the power initiated only in response to installation of canister/drive 14/16 in chassis 12, then the user simply jumpers plugs C and D together and opens plugs A and B thereby rendering switch 79 inoperable.

With plugs C and D jumpered together (i.e., with plugs A and B opened), insertion of the shorter pins 35a into their respective female sleeves 37a will supply a logic "0" to the negative or gate 90 via inverter 92. Since a logic "1" is always present at the other input to gate 90, a logic "0" will be supplied as an input to the preset input PS of flip-flop 84. This, in turn, causes logic "0" and "1" to be present at the Q and $\overline{Q}$ outputs respectively illuminating the red LED and turning the FET switches 76 and 78 on thereby enabling power to be supplied to the canister/drive 14/16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An assembly for shock-isolating a portable mass storage device of the type removable mountable with a computer chassis comprising, in combination:
   a mass storage device;
   a canister for housing said mass storage device and adapted to be removably and operatively mounted in association with the computer chassis;
   means associated with said canister for enabling the same to be grasped thereby permitting manual handling and transport of said mass storage device housed therein when operatively disassociated with the computer chassis; and
   shock-isolation means for mounting said mass storage device within said canister in shock-isolated relationship therewith, said shock-isolation means comprising:
   (i) a pair of mounting brackets each of which is rigidly attached to a respective side of said mass storage device;
   (ii) first and second pairs of elastomeric shock-isolators, said first and second pairs being mounted to and between first and second ones of said mounting brackets and an adjacent side wall of said canister, respectively, so as to mount said mass storage device in spaced relation to said canister and to thereby establish with said canister a sway space of selected dimensional extent around all sides of said mass storage device, said first and second pairs of elastomeric shock-isolators being the sole means of support for said mass storage device within said canister and arranged approximately symmetrically with respect to the mass storage device's center of gravity, wherein said mass data storage device is capable of being displaced to a maximum dimensional extent within said established sway space without contact with said canister by means said first and second pairs of elastomeric shock-isolators absorbing substantially all shock waves causing said displacement, whereby effective shock-isolation is achieved;
   (iii) each said elastomeric shock isolator including a hollow and generally cylindrical elastomeric body, means at one end of said hollow body for facilitating connection to said respective bracket, and a threaded bore at the other end of said body for facilitating connection to said adjacent canister side wall by threaded bolt means.

2. An assembly for shock-isolating a portable mass storage device of the type removably mountable with a computer chassis comprising, in combination:
   a mass storage device;
   a canister for housing said mass storage device and adapted to be removably and operatively mounted in association with the computer chassis;
   means associated with said canister for enabling the same to be grasped thereby permitting manual handling and transport of said mass storage device housed therein when operatively disassociated with the computer chassis; and
   shock-isolation means for mounting said mass storage device within said canister in shock-isolated relationship therewith, said shock-isolation means comprising:
   (i) a pair of mounting brackets each of which is rigidly attached to a respective side of said mass storage device;
   (ii) first and second pairs of elastomeric shock-isolators, said first and second pairs being mounted to and between first and second ones of said mounting brackets and an adjacent side wall of said canister, respectively, so as to mount said mass storage device in spaced relation to said canister, and said first and second pairs of elastomeric shock-isolators being the sole means of support for said mass storage device within said canister and arranged approximately symmetrically with respect to the mass storage device's center of gravity, wherein
   said assembly further comprises;
   a circuit board housed within said canister and adapted for receiving pin connectors associated with said computer chassis so as to operatively interconnect said mass storage device with the computer when the former is mounted in said chassis;
   means for electrically connecting said circuit board to said mass storage device; and
   means for resiliently mounting said circuit board to said canister to allow said circuit board to be resiliently displaced in response to mounting of said canister in said computer chassis thereby assisting the alignment of the pin connectors therewith;
   said means for mounting said circuit board including elastomeric mounting means connected to and between said circuit board and a bottom wall of said canister for allowing said circuit board to be resiliently displaced in response to mounting of said canister in said computer chassis.

3. An assembly as in claim 1 or 2, wherein said means at said one end of said body is in the form of a transverse mounting flange.

4. An assembly as in claim 1 or 2, wherein said means at said other end of said body is in the form of a nipple axially projecting from said other end of said body and defining an axially threaded bore.

5. An assembly as in claim 1 or 2, wherein said body includes a cylindrical section, and a truncated conical section integrally extending from said cylindrical section.

6. An assembly as in claim 5 wherein said one end of said body includes said cylindrical section and said other end of said body includes said truncated conical section.

7. An assembly as in claim 6, wherein said means at said one end of said body is in the form of a transverse mounting flange.

8. An assembly as in claim 6, wherein said means at said other end of said body is in the form of a nipple axially projecting from said other end of said body and defining an axially threaded bore.

9. An assembly as in claim 1 wherein each said bracket includes means for providing increased structural rigidity thereto.

10. An assembly as in claim 9, wherein said means for providing increased structural rigidity includes an integral flange bent at substantially a right angle with respect to said bracket.

11. The combination comprising a computer chassis and at least one assembly as in claim 1 operatively mounted thereto.

12. The combination comprising:
a computer chassis;
a mass storage device;
a canister for housing said mass storage device and adapted to be removably and operatively mounted in association with the computer chassis;
means associated with said canister for enabling the same to be grasped thereby permitting manual handling and transport of said mass storage device housed therein when operatively disassociated with the computer chassis; and
shock-isolation means for mounting said mass storage device within said canister in shock-isolated relationship therewith, said shock-isolation means comprising:
(i) a pair of mounting brackets each of which is rigidly attached to a respective side of said mass storage device;
(ii) first and second pairs of elastomeric shock-isolators, said first and second pairs being mounted to and between first and second ones of said mounting brackets and an adjacent side wall of said canister, respectively, so as to mount said mass storage device in spaced relation to said canister, said first and second pairs of elastomeric shock-isolators being the sole means of support for said mass storage device within said canister and arranged approximately symmetrically with respect to the mass storage device's center of gravity,
wherein said combination further comprises,
power supply means associated with said chassis for supplying electrical power to said mass storage device; and
means for disconnecting said electrical power supplied to said mass storage device in response to removal of said canister from said chassis, wherein said means of disconnecting said electrical power includes;
(a) connector means having multiple pins for establishing electrical communication between said power supply means and said mass storage device when said canister is operatively positioned in said chassis;
(b) at least some of said pins of said connector having a shorter length as compared to other longer ones of said pins so that said shorter pins are disconnected prior to said longer pins during removal of said canister from said chassis; and
(c) sensing and disconnecting means operatively connected between said power supply means and said shorter and longer pins of said connector means for (i) sensing said prior disconnection of said shorter pins, and in response thereto (ii) disconnecting said power supplied to said longer pins, whereby said power supplied to said mass storage device is disconnected.

13. The combination as in claim 12, wherein said sensing and disconnecting means includes a field effect transistor.

14. The combination as in claim 12, wherein said shorter pins are about 2 mm shorter in length as compared to said longer pins.

15. The combination as in claim 12, wherein said sensing and disconnecting means includes;
field effect transistor switch means having an input connected to said power supply means and an output connected to a predetermined one of said longer pins, said field effect transistor switch means disconnecting said power supply means and said predetermined one of said longer pins in response to receiving a first predetermined voltage potential;
means operatively connected between said shorter pins and said field effect transistor means for normally supplying a second predetermined voltage potential to said field effect transistor means when said canister is operatively associated with said chassis, and for supplying said first predetermined voltage potential to said field effect transistor means in response to said prior disconnection of said shorter pins during removal of said canister from said chassis.

16. The combination as in claim 15 wherein said means for normally supplying said second predetermined voltage potential to said field effect transistor means includes:
a flip-flop circuit which supplies said second predetermined potential to said field effect transistor means when said canister is operatively associated with said chassis; and
means for driving said flip-flop circuit in response to said prior disconnection of said shorter pins to cause said flip-flop circuit to output said first predetermined voltage potential to said field effect transistor means.

17. In a mass storage device of the type which is removably mountable within the chassis of a computer so that the device is capable of being used in operative association with the computer when mounted in the chassis, yet capable of being dismounted therefrom so as to be transported to a different location until it is desired to again operatively mount the same within the computer chassis, the improvement wherein said mass storage device includes means for shock-isolating the same at all times during said operative association within said computer chassis and also during said transport thereof to said different location, and wherein said means for shock-isolating includes:
a canister having at least an opposing pair of side walls, and opposing front and rear walls, said side, front and rear walls collectively laterally bounding said mass storage device while leaving an open sway space therebetween;
a pair of mounting brackets each rigidly attached to a respective side of said mass storage device; and
shock-isolating means mounted to, and between, said mounting brackets and a respective adjacent one of said side walls for mounting said mass storage device in spaced relation to said canister, wherein
said shock isolating means includes first and second pairs of elastomeric shock-isolators attached to one and the other of said mounting brackets, respectively, each said shock-isolator having a cylindrical section adjacent said respective mounting bracket, and a truncated conical section integrally extending from said cylindrical section twowards said adjacent side wall, wherein the improvement further comprises,
a circuit board housed within said canister and adapted for receiving pin connectors associated with said computer chassis so as to operatively interconnect said mass storage device with the computer when the former is mounted in said chassis;
means for electrically connecting said circuit board to said mass storage device; and
means for resiliently mounting said circuit board to said canister to allow said circuit board to be resiliently displaced in response to mounting of said canister in said computer chassis thereby assisting with the alignment of the pin connectors therewith;
said means for mounting said circuit board including elastomeric mounting means connected to and between said circuit board and a bottom wall of said canister for allowing said circuit board to be resiliently displaced in response to mounting of said canister in said computer chassis.

18. In a mass storage device as in claim 17, the improvement wherein said canister includes handle means attached to said front wall for permitting said canister to be manually grasped and transported to said different location.

19. A shock-isolated mass storage assembly comprising:
a chassis having a power supply;
a mass storage device;
a canister for housing said mass storage device and adapted to be removably and operatively mounted in association with said chassis;
shock-isolation means mounted between said mass storage device and said canister for shock-isolating said mass storage device within said canister; and
means for disconnecting electrical power supplied to said mass storage device in response to removal of said canister from said chassis, wherein said means for disconnecting said electrical power includes;
(a) connector means associated with said canister and having multiple pins for establishing electrical communication between said power supply and said mass storage device when said canister is operatively positioned in said chassis;
(b) at least some of said pins of said connector having a shorter length as compared to other longer ones of said pins so that said shorter pins are disconnected prior to disconnection of said longer pins during removal of said canister from said chassis; and
(c) sensing and switching means operatively connected between said power supply and said shorter and longer pins of said connector means for (i) sensing said prior disconnection of said shorter pins, and in response thereto (ii) disabling said power supplied to said longer pins, whereby said power supplied to said mass storage device is disconnected.

20. A mass storage assembly as in claim 19, wherein said sensing and disabling means includes a field effect transistor.

21. A mass storage assembly as in claim 19 wherein said shorter pins are about 2 mm shorter in length as compared to said longer pins.

22. A combination storage assembly as in claim 19, wherein said sensing and disabling means includes;
field effect transistor switch means having an input connected to said power supply and an output connected to a predetermined one of said longer pins, said field effect transistor switch means disconnecting said power supply means and said predetermined one of said longer pins in response to receiving a high voltage potential;
means operatively connected between said shorter pins and said field effect transistor means for normally supplying a low voltage potential to said field effect transistor means when said canister is operatively associated with said chassis, and for supplying a high voltage potential to said field effect transistor means in response to said prior disconnection of said shorter pins during removal of said canister from said chassis.

23. A mass storage assembly as in claim 22 wherein said means for normally supplying a low voltage potential to said field effect transistor means includes;
flip-flop circuit means which supplies a low voltage potential to said field effect transistor means when said canister is operatively associated with said chassis; and
means for driving said flip-flop circuit means in response to said prior disconnection of said shorter pins to cause said flip-flop circuit means to output a high voltage potential to said field effect transistor means.

24. A system adapted to automatically disable a supply of electrical power from a power source to an electrical component comprising:
separable first and second connector means for establishing electrical connection between said power source and said electrical component;
said separable first and second connector means each having respective first and second matable subconnectors, wherein said first subconnectors of said first and second connector means physically separate prior to physical separation of said second subconnectors of said first and second connector means during relative separable movement therebetween; and
sensing means for sensing said prior physical separation of said first subconnectors during said relative separable movement between said first and second connector means and, in response to said sensed prior physical separation, for disabling said supply of electrical power to said electrical component.

25. A system adapted to supply electrical power from a power source to an electrical component comprising:
separable first and second connector means for establishing electrical connection between said power source and said electrical component; and
sensing means for sensing relative separable movement between said first and second connector means and, in response to said sensed separable movement, for disabling said supply of electrical power to said electrical component, wherein
one of said first and second connector means is a multiple pin male connector and the other of said first and second connector means is a female connector adapted to matably receive the pins of said male connector, and wherein
said sensing means includes:
(a) at least one male/female connector pair being shorter in length as compared to other male/- female connector pairs such that said at least one shorter pair is disconnected prior to disconnection of said other longer pairs in response to relative separable movement between said male and female connectors; and (b) sensing and disabling means operatively sensing said prior disconnection and, in response thereto, disabling said power supply to said other longer pairs.

26. A system as in claim 24 or 25, wherein said sensing and disabling means includes a field effect transistor.

27. A system as in claim 25 wherein said at least one shorter pin is about 2 mm shorter in length as compared to said other longer connector contacts.

28. A system as in claim 25, wherein said sensing and disabling means includes;

field effect transistor switch means having an input connected to said power source and an output connected to a predetermined one of said longer connector contacts said field effect transistor switch means disconnecting said power source and said predetermined one of said longer connector contacts in response to receiving a first predetermined potential;

means operatively connected between said at least one shorter connector contacts and said field effect transistor means for normally supplying a second predetermined voltage potential to said field effect transistor means when said first and second connector means are operatively connected to one another, and for supplying said first predetermined voltage potential to said field effect transistor means in response to said prior disconnection of said at least one shorter connector contacts during separable movement of said first and second connectors.

29. The combination as in claim 28, wherein said means for normally supplying said second predetermined voltage potential to said field effect transistor means includes;

flip-flop circuit means which supplies said second predetermined voltage potential to said field effect transistor means when said first and second connector means are operatively connected to one another; and means for driving said flip-flop circuit means in response to said prior disconnection of said at least one shorter connector contacts to cause said flip-flop circuit means to output said first predetermined voltage potential to said field effect transistor means.

* * * * *